United States Patent [19]
Hope

[11] Patent Number: 6,134,857
[45] Date of Patent: *Oct. 24, 2000

[54] STRUCTURAL CORNER REINFORCEMENT, A FRAME INCLUDING SUCH A REINFORCEMENT AND METHODS OF MANUFACTURING THESE PRODUCTS

[75] Inventor: Robert Hope, Toronto, Canada

[73] Assignee: Bay Mills Ltd, Weston, Canada

[*] Notice: This patent is subject to a terminal disclaimer.

[21] Appl. No.: 09/050,376

[22] Filed: Mar. 31, 1998

Related U.S. Application Data

[63] Continuation-in-part of application No. 08/729,275, Oct. 10, 1996, which is a continuation-in-part of application No. 08/928,623, Sep. 12, 1997.

[51] Int. Cl.[7] .............................. E06B 3/00; E06B 5/00; E06B 7/00

[52] U.S. Cl. ...................... 52/656.7; 52/656.6; 52/656.5; 52/742.13; 52/745.15; 52/745.19; 52/309.5; 52/309.7; 264/46.6; 264/46.7; 403/269; 403/402; 49/425

[58] Field of Search ............................... 52/656.4, 656.7, 52/656.5, 656.6, 657, 309.5, 309.7, 745.15, 745.16, 742.13, 745.19; 264/46.6, 46.7; 403/231, 265, 269, 401–403; 49/425

[56] References Cited

U.S. PATENT DOCUMENTS

| | | |
|---|---|---|
| 1,852,866 | 4/1932 | Weitzel . |
| 2,717,667 | 9/1955 | Bancroft . |
| 2,762,430 | 9/1956 | Sylvan . |
| 2,989,788 | 6/1961 | Kessler . |
| 3,284,113 | 11/1966 | Howell . |
| 3,319,985 | 5/1967 | Arnett . |
| 3,321,885 | 5/1967 | Pratt . |
| 3,334,464 | 8/1967 | Charles . |
| 3,386,208 | 6/1968 | Banner . |
| 3,606,419 | 9/1971 | Virkler et al. . |
| 3,729,868 | 5/1973 | Burum . |
| 3,885,371 | 5/1975 | Oakes . |
| 3,924,377 | 12/1975 | Gill . |
| 3,949,526 | 4/1976 | Sherlock et al. . |
| 3,965,638 | 6/1976 | Newman . |
| 4,006,513 | 2/1977 | Offterdiner . |
| 4,030,160 | 6/1977 | Lambertz et al. . |
| 4,112,622 | 9/1978 | Stewart . |
| 4,128,934 | 12/1978 | Doring . |
| 4,169,304 | 10/1979 | Binder . |
| 4,342,144 | 8/1982 | Doguchi . |
| 4,452,138 | 6/1984 | Budley et al. . |
| 4,502,260 | 3/1985 | Machler . |

(List continued on next page.)

FOREIGN PATENT DOCUMENTS

| | | |
|---|---|---|
| 2111918 | 6/1995 | Canada . |
| 1000616 | 8/1965 | United Kingdom . |

*Primary Examiner*—Robert Canfield
*Attorney, Agent, or Firm*—Duane Morris & Heckscher, LLP

[57] ABSTRACT

A structural corner reinforcement for strengthening frames includes at least a first segment and a second segment of frame bar, each formed into a desired profile and each having a hollow interior portion, a reinforcing channel having a first leg and a second leg arranged at an angle to the first leg, with ends of the channel securing first and second extensions to extend the first and second legs, respectively, at least one of (i) a portion of the first extension of the reinforcing channel being inserted through a first end of the first segment of the frame bar into and substantially spaced from surfaces of the hollow interior portion of the first segment and (ii) a portion of the second extension of the reinforcing channel being inserted through a first end of the second segment of the frame bar into and substantially spaced from surfaces of the hollow interior portion of the second segment, and a rigid reinforcing and structural material, formed from a foamed chemical, inside at least one of (i) the hollow interior portion of the first segment for securing the inserted portion of the first extension of the reinforcing channel therewithin and (ii) the hollow interior portion of the second segment for securing the inserted portion of the second extension of the reinforcing channel therewithin.

88 Claims, 8 Drawing Sheets

U.S. PATENT DOCUMENTS

| | | |
|---|---|---|
| 4,570,406 | 2/1986 | DiFazio . |
| 4,580,380 | 4/1986 | Ballard . |
| 4,630,959 | 12/1986 | Glaser ............... 403/266 |
| 4,651,482 | 3/1987 | Borys . |
| 4,831,804 | 5/1989 | Sayer . |
| 4,873,741 | 10/1989 | Riegelman . |
| 4,943,180 | 7/1990 | Durham ............... 403/295 |
| 5,018,263 | 5/1991 | Stern . |
| 5,067,842 | 11/1991 | Ponting ............... 403/265 |
| 5,229,813 | 7/1993 | Cherian . |
| 5,292,190 | 3/1994 | Lautenschläger et al. . |
| 5,431,211 | 7/1995 | Guillemet . |
| 5,473,853 | 12/1995 | Guillemet et al. . |
| 5,485,705 | 1/1996 | Guillemet . |
| 5,921,051 | 7/1999 | Hope ............... 52/656.9 X |

STRUCTURAL CORNER REINFORCEMENT, A FRAME INCLUDING SUCH A REINFORCEMENT AND METHODS OF MANUFACTURING THESE PRODUCTS

RELATED APPLICATION INFORMATION

This application is a continuation-in-part of copending application Ser. No. 08/729,275, filed Oct. 10, 1996, and a continuation-in-part of copending application Ser. No. 08/928,623 filed Sep. 12, 1997.

BACKGROUND OF THE INVENTION

1. Field of the Invention

This invention relates to a structural corner reinforcement for architectural or structural members such as frame sections or frames for screens, windows, doors, shutters, plastic panels, and the like, a frame including such a structural reinforcement and methods of manufacturing these products.

2. Description of the Related Art

For convenience of discussion, the invention will be defined and described with particular reference to structural reinforcements for use in frame sections or frames. Nevertheless, it will be understood that the invention is of general utility.

Frames for screens, windows, doors, shutters, plastic panels and the like are commonly made of four elongated frame members of uniform cross section connected together by corner assemblies. These frame members are typically roll-formed from aluminum or sheet steel, although some may be extruded plastic or aluminum, and some of these frame members are foam-filled to increase their strength. For example, U.S. Pat. No. 3,885,371 shows a roll-formed sheet metal window frame filled with a rigid lightweight foamed material such as polyurethane.

These frames must have adequate strength as well as longitudinal and torsional rigidity, and the corners and joints must be rigid. These frames also must be durable and resist impact, damage and corrosion. Further, these frames must meet at least these practical requirements without excessive weight or cost.

For example, in the case of large screen frames, particularly those used for patio door screens, prior corner connectors have been inadequate to sufficiently prevent twisting or bending of the frame. The twisting or bending of the frame out of its plane is particularly troublesome when the frame is removed from its support framing, for maintenance or cleaning, and then an attempt is made to replace it. The twisting or bending also presents problems during normal operation if the frame binds in its support tracks.

U.S. Pat. No. 4,570,406 shows an inexpensive, molded plastic corner connector key, which frictionally interconnects with the end portions of conventional screen frame members that can be square cut rather than mitered. The corner connector itself forms the exposed corner of the frame and thus is sized and shaped to match or blend with the ends of the frame members to form a visually uniform frame. The connector key has two rectangular, tubular-shaped legs arranged at right angles. The legs integrally fit within and are frictionally locked in face-to-face contact against the interior wall surfaces of the frame members.

U.S. Pat. No. 5,431,211, commonly assigned to the assignee of the subject application, shows a corner assembly for a window screen frame. The corner assembly has a pair of connector arms extending outwardly from a corner connector, generally at ninety degrees relative to each other. The connector arms are telescopically received in gripping relation within corresponding channels of side members of the frame.

U.S. Pat. No. 4,651,482 shows a corner piece for connecting adjacent hollow frame members to form a frame used in the construction of thermally insulated windows. The corner piece includes horizontal and vertical legs formed at a right angle. One end of each leg has a cutting edge. When the ends of each leg are inserted into a hollow frame member, which has internal partitions, the sharpened cutting edge is able to cut around the adjacent partition to enter the frame member. Sealant may be injected into the corner pieces and the frame members after assembly to seal off any gaps around the installed corner piece.

The foregoing corner connectors have a significant drawback, however, in that wedging the corner piece into the frame member can deform the frame member. This may result in jamming of the frame member during movement in its track or guide. Also, these current corner connectors concentrate loading of force at the points of contact, rather than distributing the loading. Such point loading results in local, permanent deformation of the light gauge metal frame members near the point loads. Once permanent deformation occurs, a clearance gap is formed, which allows movement (i.e., play) between the corner insert and the frame member. This play lessens the stiffness of the corner connection and the integrity of the entire frame assembly. Once clearance is established, and movement allowed, the connection is "worked" in operation and clearances increase further. To reduce the local deformation, thicker gauge frame members are required. This increases costs.

The initial clearances that are required between the corner insert and the frame members in order to insert current corner connectors also can reduce corner rigidity and torsional strength. A certain clearance is necessary to allow easy, hand assembly of the corner insert in the frame assembly. Although a snug fit is desired, practical stamping/molding and roll-forming tolerances allow play, which should be avoided, as discussed above. To reduce this play, and to prevent the corner connector from sliding out, some have proposed bending portions of the aluminum roll-formed section of the frame into pre-cut holes in the metal corner connector. This is known as staking.

Patio doors, in order to slide in their tracks, are usually provided with wheels mounted at the four corners of the door frame. For example, U.S. Pat. No. 3,729,868 shows a screen door having L-shaped corner connectors that include extensions which frictionally fit into interior spaces of the door frame. A sidewall of each connector is aligned with a rail of the door frame and includes a cutout that enables a guide roller or wheel to protrude therethrough. The roller is mounted to a bracket in a hollow interior space of the connector and pivots about a pin anchored in the connector. A leaf spring biases the roller into the rail of the door frame. The device in the '868 patent, while simplifying construction of the screen door, does not provide a frame having adequate strength and longitudinal and torsional rigidity, especially at the corners.

Accordingly, a need has arisen for a structural corner reinforcement and a frame including such a reinforcement, which overcome the drawbacks noted above with respect to conventional corner assemblies. There is an additional need for methods of making these products.

SUMMARY OF THE INVENTION

In one aspect, the structural corner reinforcement of this invention includes at least a first segment and a second segment of frame bar, each formed into a desired profile and each having a hollow interior portion, a reinforcing channel, and a rigid reinforcing and structural material. The reinforcing channel has a first leg and a second leg arranged at an angle to the first leg. At least one of (i) a portion of the first leg of the reinforcing channel is inserted through a first end of the first segment of the frame bar into and substantially spaced from a surface of the hollow interior portion of the first segment and (ii) a portion of the second leg of the reinforcing channel is inserted through a first end of the second segment of the frame bar into and substantially spaced from a surface of the hollow portion of the second segment. The rigid reinforcing and structural material, formed from a foamed chemical, is inside at least one of (i) the hollow interior portion of the first segment for securing the inserted portion of the first leg of the reinforcing channel therewithin and (ii) the hollow interior portion of the inserted portion of the second segment for securing the inserted portion of the second leg of the reinforcing channel therewithin. In another aspect, the present invention provides a method of making such a structural corner reinforcement for use in strengthening frames.

In still another aspect, this invention provides a frame including structural corner reinforcements. The frame includes first and second short segments of frame bar and first and second long segments of frame bar, each segment being formed into a desired profile and each having a hollow interior portion, four reinforcing channels, and a rigid reinforcing and structural material. Each of the reinforcing channels has a first leg and a second leg arranged at an angle to the first leg. At least one of (i) a portion of the first leg of a respective reinforcing channel is inserted through an end of each short segment of the frame bar into and substantially spaced from a surface of the hollow interior portion of the short segment and (ii) the second leg of a respective reinforcing channel is inserted through an end of each long segment of the frame bar into and substantially spaced from a surface of the hollow interior portion of the long segment. The rigid reinforcing and structural material, formed from a foamed chemical, is inside at least one of (i) the hollow interior portion of each short segment for securing respective inserted portions of the first legs of the reinforcing channels therewithin and (ii) the hollow interior portion of each long segment for securing respective inserted portions of the second legs of the reinforcing channels therewithin.

The present invention, in yet another aspect, provides a method of making a frame including such structural corner reinforcements.

In the present invention, if desired, as one example, each of the segments of the frame bar can have a recess for securing screen, for example, therein and can be made of a material selected from the group consisting of extruded aluminum, roll-formed aluminum, roll-formed sheet steel, extruded plastic and pultruded, glass-reinforced thermosetting resin.

In the present invention, the inserted portions of the reinforcing channel are sufficiently spaced from the surfaces of the hollow interior portions of the frame bar segments for allowing the foamed chemical, prior to curing, to pass between the inserted portions and the surfaces of the hollow interior portions.

The reinforcing channel, and particularly the legs of the reinforcing channel, can be made of more than one piece, or of several pieces, joined together. In one aspect, the reinforcing channel can have a substantially U-shaped cross section and a bend at, for example, approximately ninety degrees, with the ends of the channel being crimped, roll-formed, knurled, welded or otherwise modified to secure extensions, such as reinforcing bar (preferably steel reinforcing bar), to constitute the first and second legs of the reinforcing channel. Of course, the extensions can be made of other suitable materials. Also, the reinforcing channel can be a unitary piece preferably having either a substantially U-shaped cross section or a substantially Z-shaped cross section and a bend at, for example, approximately ninety degrees to form the first and second legs.

The reinforcing channel can be steel, preferably plated, or made of a high strength resin or plastic. The cross section of the reinforcing channel is significantly smaller than cross sections of the hollow interior portions of the frame bar segments for allowing the foamed chemical to pass between the reinforcing channel and a surface of the hollow interior portions.

In another aspect, a wheel mechanism can be secured to one of the legs of the reinforcing channel, the wheel mechanism including a wheel for being guided in a track of the frame. In one aspect, the center line of the wheel mechanism is aligned with the center line of the leg of the reinforcing channel to which the wheel mechanism is secured. A decorative cover, including side panels, can encase the wheel mechanism.

In the present invention, the frame bar segments can include injection apertures, with the structural material being, for example, polyurethane foaming material, having been injected into the segments through the injection apertures and solidified. If desired, each frame bar segment can include a retainer to limit or define the foamed region of the frame bar segment. In this aspect, the foamed chemical is injected directly into the frame bar segment and is substantially retained therein by the retainer. If an extension is utilized with the retainer, the portion of the extension opposite the foamed side of the retainer can be, if necessary, painted or otherwise treated chemically, for example, to protect against weathering, rust, corrosion and the like.

In another aspect, the decorative cover can be enclosed and be provided with an injection aperture for the injection of the foaming material. Thus, the rigid reinforcing and structural material, formed from a foamed chemical, also can be provided from inside regions of the decorative cover.

BRIEF DESCRIPTION OF THE DRAWINGS

Like reference numerals have been used for like or corresponding elements throughout the views.

DETAILED DESCRIPTION OF THE PREFERRED EMBODIMENTS

Figure 1A:
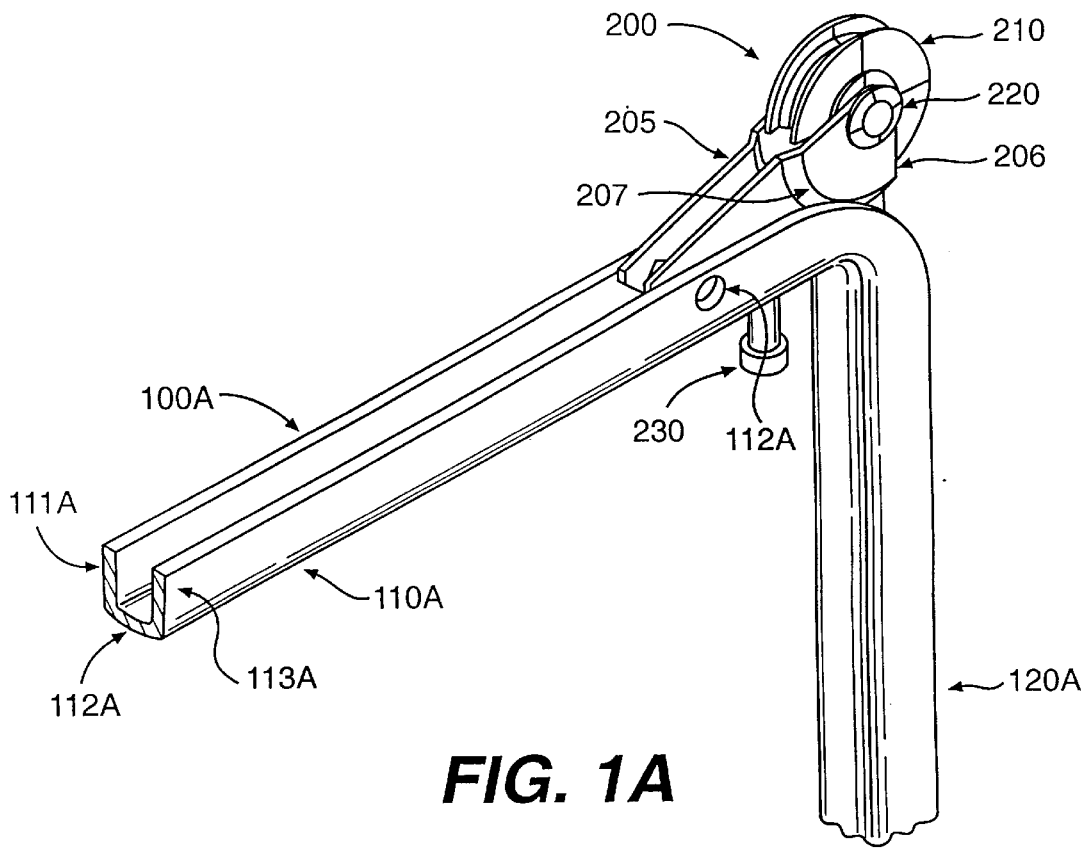
FIG. 1A schematically shows a portion of one embodiment of the reinforcing channel used in the structual corner reinforcement of the present invention, including an optional wheel assembly.

FIG. 1A schematically shows a portion of one embodiment of a reinforcing channel 100A used in the structural corner reinforcement of the present invention (which will be discussed in more detail below), including an optional wheel assembly 200. In this embodiment, the reinforcing channel 100A is preferably a unitary piece having a substantially U-shaped cross section and a bend preferably at approximately ninety degrees to form a first leg 110A and a second leg 120A. The reinforcing channel 100A can be made of either steel, preferably plated, or a high strength resin or plastic, for example. If desired, other materials can be used, provided they result in the desired strength and rigidity achieved by the present invention. If made of plated steel, the reinforcing channel 100A can be roll-formed from flat stock. If made of high strength plastic, the reinforcing channel 100A can be molded or extruded. Representative dimensions for leg 110A, for example, of the reinforcing channel 100A are 0.500 inches in overall height for arms 111A and 113A, 0.400 inches in overall width for base 112A and 0.078 inches in thickness. However, these dimensions can be varied as desired.

Wheel assembly 200 includes a wheel 210 mounted to wheel assembly frame 205 by axle 220. The wheel assembly 200 may be of the type discussed in more detail in published Canadian patent application No. 2,111,918. Wheel assembly frame 205 includes a wheel well 206 formed by flared portion 207. Flared portion 207 flares outwardly from wheel assembly frame 205 by a sufficient amount to form wheel well 206. A set screw 230 adjusts the height of the wheel assembly 200 when wheel assembly 200 is secured in place using a fastener or pin 240 (best seen in FIG. 2A). Fastener 240 is inserted through a hole 112A drilled or otherwise formed in first leg 110A of reinforcing channel 100A. A center line of the wheel assembly 200 is aligned with a center line of first leg 110A of reinforcing channel 100A, to which it is attached.

Figure 1C:
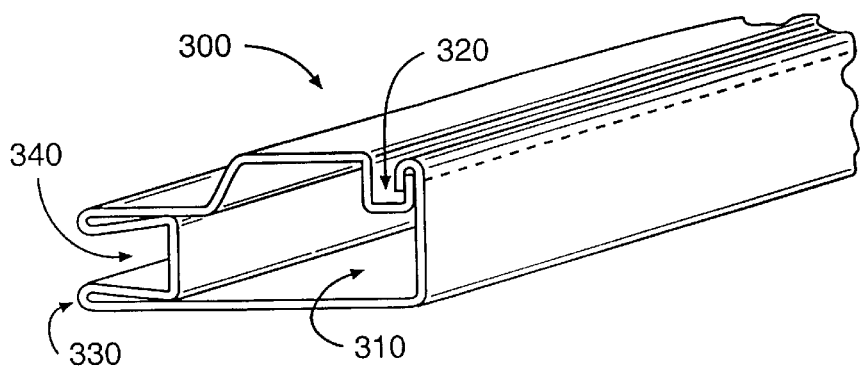
FIG. 1C schematically shows a portion of a roll-formed frame bar that can be used in the present invention, prior to being injected with a rigid reinforcing and structural material, formed from a foamed chemical, and prior to insertion of the reinforcing channel of this invention.
Figure 1B:
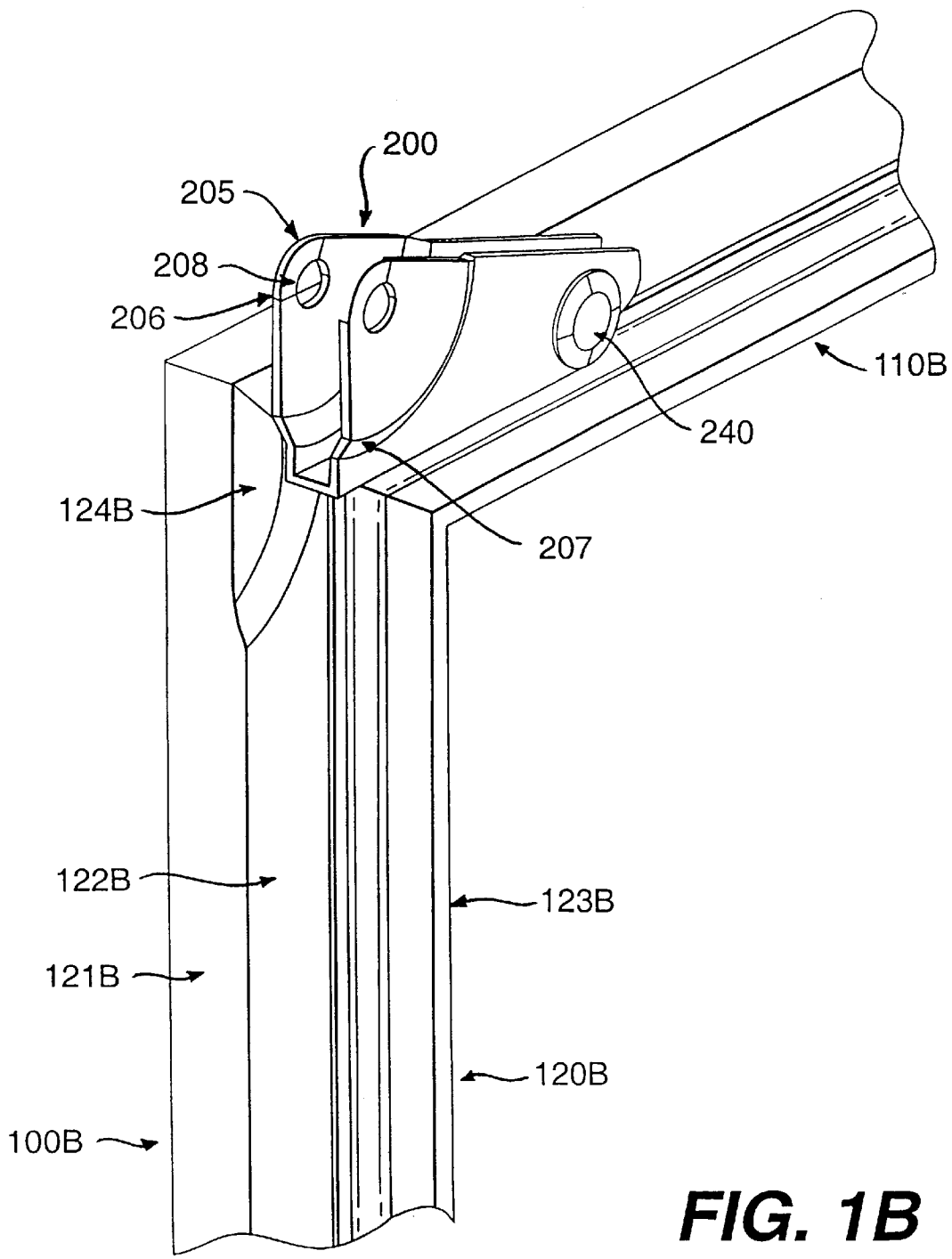
FIG. 1B schematically shows a portion of another embodiment of the reinforcing channel used in the structural corner reinforcement of the present invention, including an optional wheel assembly.

FIG. 1B schematically shows a portion of another embodiment of a reinforcing channel 100B used in the foam-filled structural corner reinforcement of the present invention (which will be discussed in more detail below), including a portion of optional wheel assembly 200. In this embodiment, the reinforcing channel 100B is preferably a unitary piece having a substantially "Z-shaped" cross section and a bend preferably at approximately ninety degrees to form a first leg 110B and a second leg 120B. Although I use the term "Z-shaped", in this embodiment, reinforcing channel 100B has three substantially straight segments 121B, 122B and 123B each arranged at approximately ninety degrees sequentially from the other. The reinforcing channel 100B can be made of either steel, preferably plated, or a high strength resin or plastic, for example. If desired, other materials can be used, provided they result in the desired strength and rigidity achieved by the present invention. If made of plated steel, the reinforcing channel 100B can be roll-formed or stamped from flat stock. If made of high strength plastic, reinforcing channel 100B can be molded or extruded.

The ninety degree bends of the reinforcing channel 100A or 100B will accommodate square or rectangular frames, for example. Nevertheless, other angles can be used for other geometries. In fact, if desired, the reinforcement of this invention could be circular, oval, elliptical or otherwise. Also, as will be discussed in more detail below, the legs of the reinforcing channels could be separate pieces if desired.

I am using the term "reinforcing channel" to refer to members having a substantially U-shaped cross section, as shown in FIG. 1A or a substantially Z-shaped cross section, as shown in FIG. 1B, as well as to include other geometries, taken individually or in combination, such as round, square, rectangular, and the like, whether open, partially enclosed or completely enclosed.

Representative dimensions for second leg 120B, for example, of reinforcing channel 100B are 0.375 inches in height for segment 121B, 0.750 inches in width for segment 122B and 0.375 inches in height for segment 123B. Second leg 120B is typically 0.750 inches in overall width, 0.500 inches in overall height and 0.100 inches in thickness. However, these dimensions can be varied as desired. Further, these dimensions will depend on the dimensions of the fillets and rounds generated when the reinforcing channel 100B is formed.

Wheel assembly 200 shown in FIG. 1B includes those features discussed above with respect to FIG. 1A. FIG. 1B further shows holes 208 formed in wheel well 206 of wheel assembly frame 205 for receiving axle 220 (not shown). Although not shown in FIG. 1B, set screw 230 is provided for adjusting the height of the wheel assembly 200 when wheel assembly 200 is secured in place using a fastener or pin 240.

Since, in this embodiment, wheel assembly 200 includes wheel well 206 formed by flared portion 207, segment 121B of reinforcing channel 100B must be stamped or machined as shown by region 124B in FIG. 1B. Region 124B is recessed sufficiently to accommodate wheel well 206 of wheel assembly 200. Of course, one having ordinary skill in the art recognizes that if wheel assembly 200 does not include flared portion 207, then it is not necessary to provide recessed portion 124B in reinforcing channel 100B. An advantage provided by this embodiment is that wheel assembly 200 is constrained on only one side, by segment 121B, rather than being constrained by the two sides of reinforcing channel 100A shown in FIG. 1A. This assists in locating and mounting wheel assembly 200.

FIG. 1C schematically shows a portion of a roll-formed frame bar 300 that can be used in the present invention, prior to being injected with a rigid reinforcing and structural material, formed from a foamed chemical, and prior to insertion of the legs of the reinforcing channel of this invention. As discussed above, for ease of discussion, the invention will be defined and described with particular reference to structural reinforcements for use in frame sections or frames. As one example, the frame bar can be formed as screen bar for use in screen frames. This, however, does not limit the applications of the structural reinforcement of the present invention. Rather, it will be understood that the invention is of general utility such as a structural reinforcement for frame sections or frames for windows, doors, shutters, plastic panels (transparent, translucent, opaque, etc.) and like architectural or structural members.

The frame bar 300 has a hollow interior portion 310 and, if used as screen bar, can have a groove 320 for receiving screen (not shown) therein. Conventionally, the screen can be secured in groove 320 using a stuffer strip known as spline. Of course, other equivalent techniques may be used, if desired.

The frame bar 300 also includes bent portions 330, which are bent one hundred eighty degrees, in order to form a guide trough 340 for sliding along a track of a frame, which will be discussed in more detail below. Frame bar 300 is typically rolled-formed from aluminum or sheet steel, although it also may be extruded from aluminum. Further, it may be extruded plastic or pultruded, glass-reinforced thermosetting resin, for example. Also, I have found that guide trough 340 is a preferred location for injecting the foamed material, as will be discussed in more detail below.

Figure 2A:
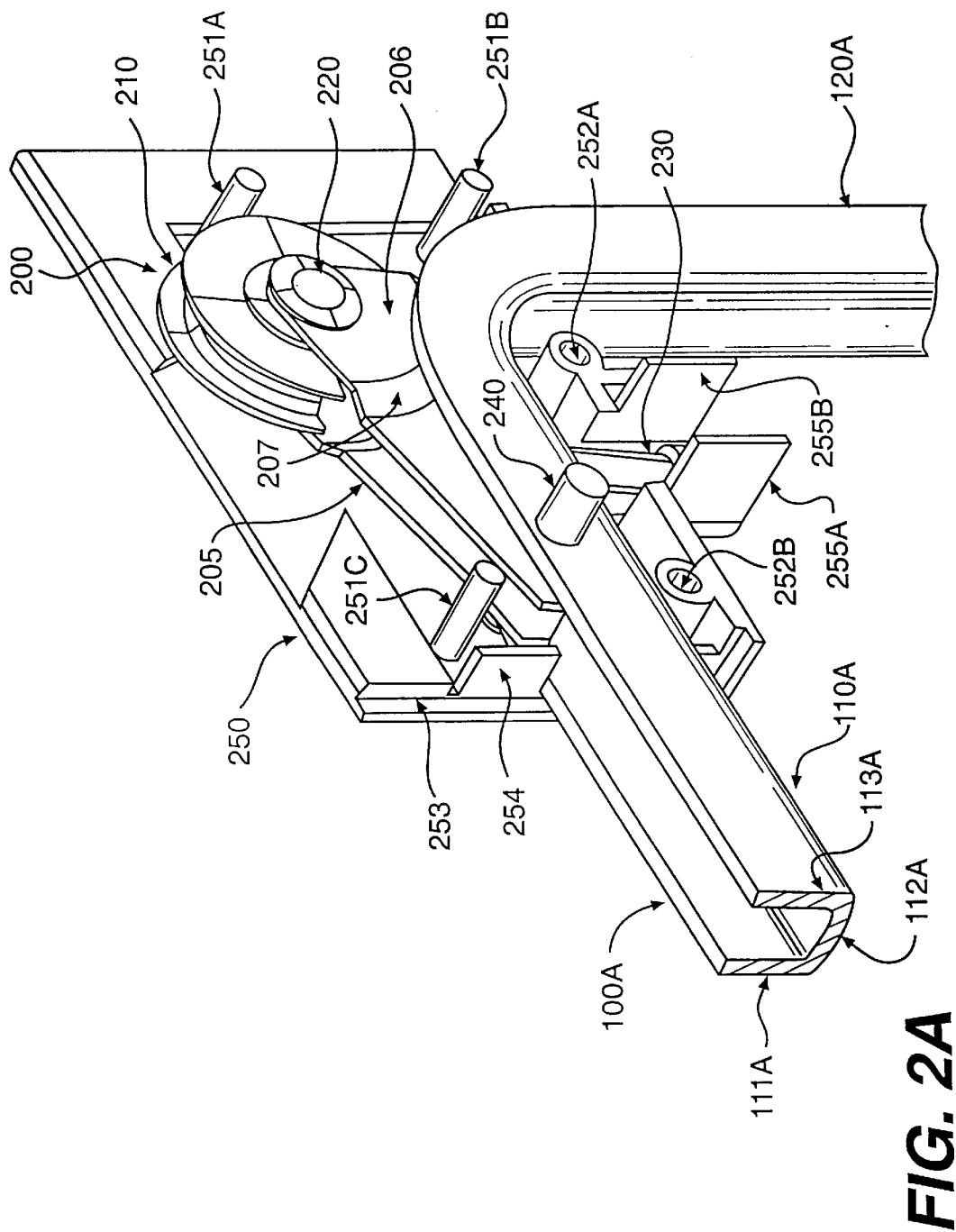
FIG. 2A shows, as one embodiment of the present invention, the reinforcing channel and optional wheel assembly of FIG. 1A with a portion of the decorative cover for covering the wheel assembly.
Figure 2B:
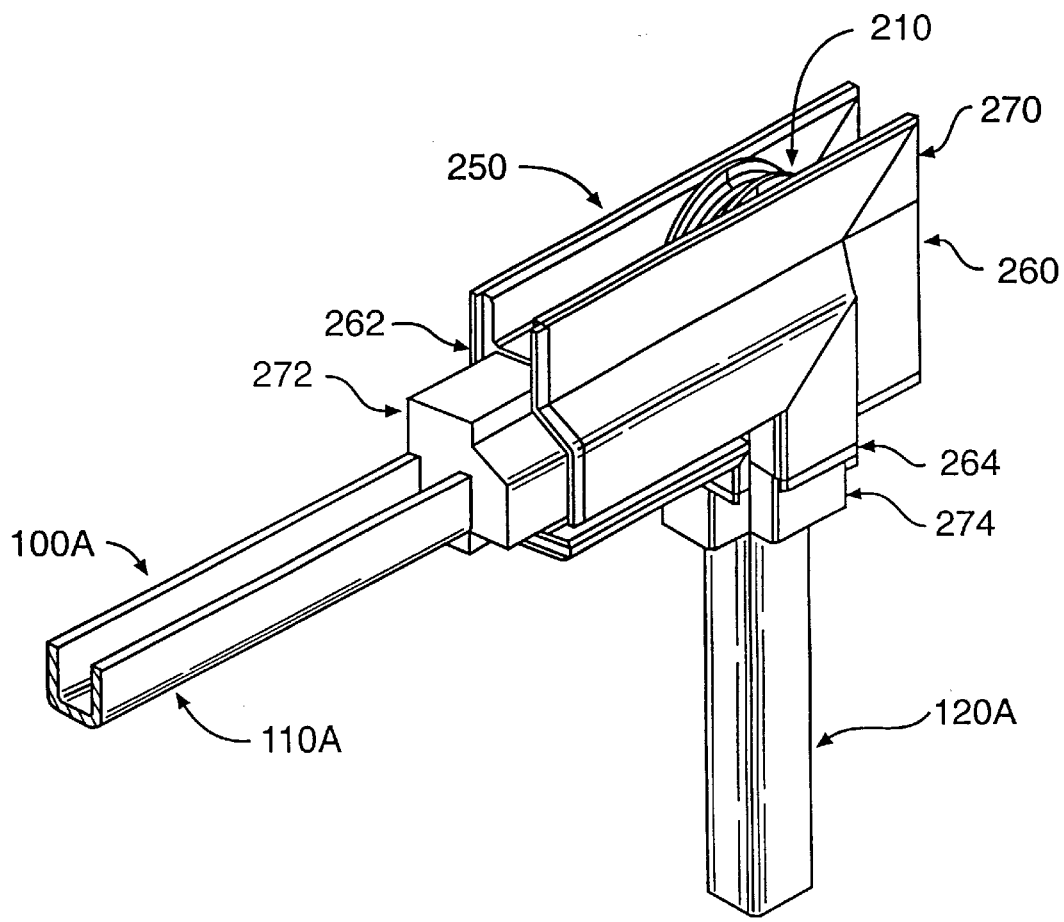
FIG. 2B shows the reinforcing channel of FIG. 2A with the decorative cover, and connector caps that can be provided in place.

FIG. 2A shows, as one embodiment of the present invention, the reinforcing channel 100A and optional wheel assembly 200 of FIG. 1A assembled to a decorative side panel 250, which, together with a mating decorative side panel 260 shown in FIG. 2B, forms a decorative cover 270 for covering the wheel assembly 200. Side panel 250 includes pins 251A through 251C and receptacles 252A and 252B for securing mating decorative side panel 260 shown in FIG. 2B. Side panel 260 includes corresponding pins and receptacles (not shown). Side panel 250 also includes partial blinds 255A and 255B for hiding set screw 230 and a recess 253 for receiving frame bar 300 as will be apparent from the discussion below. If desired, side panel 250 also can include a stop 254 for reasons that also will be apparent from the discussion below. Side panel 250 and side panel 260 can be molded or otherwise readily formed from resin or plastic such as polypropylene, vinyl, painted ABS (acrylonitrile butadiene styrene) or ASA (acrylonitrile styrene acrylate). Of course, other equivalent materials can be used as desired. These side panels also can be formed into a variety of shapes and configurations as is desired.

Although the reinforcing channel 100A of FIG. 1A is discussed herein with respect to this embodiment of the present invention, one having ordinary skill in the art would recognize that reinforcing channel 100B of FIG. 1B, reinforcing channel 100C of FIG. 2C, discussed below, and other configurations are equally applicable, and can be readily received by decorative side panel 250 and decorative side panel 260, with only slight modifications to the side panels. Therefore, for the sake of brevity only, decorative side panels 250 and 260 will be discussed with reference to reinforcing channel 100A. This discussion, however, does not limit the invention to the use of reinforcing channel 100A. Rather, other configurations within the concepts of the present invention can be used as desired.

FIG. 2B shows the reinforcing channel 100A of FIG. 2A, for example, with decorative cover 270 in place. As discussed above, decorative cover 270 has been formed by joining decorative side panel 260 to decorative side panel 250 using corresponding pins 251A through 251C and receptacles 252A and 252B.

FIG. 2B also shows connector caps 272 and 274 that can be used. If utilized, these connector caps can be partially inserted into respective ends 262 and 264 of decorative cover 270 for assisting in securing frame bar 300 in recess 253 of decorative cover 270. FIG. 2B shows connector caps 272 and 274 as being tightly secured to legs 110A and 120A of reinforcing channel 100A. However, these connector caps may just as well be hollow connectors and not tightly secured to the legs 110A and 120A of reinforcing 100A, for the reasons that will be discussed in more detail below. Also, connector caps 272 and 274 can be omitted altogether, in which case, the frame bar 300 is secured directly to decorative cover 270.

Figure 2C:
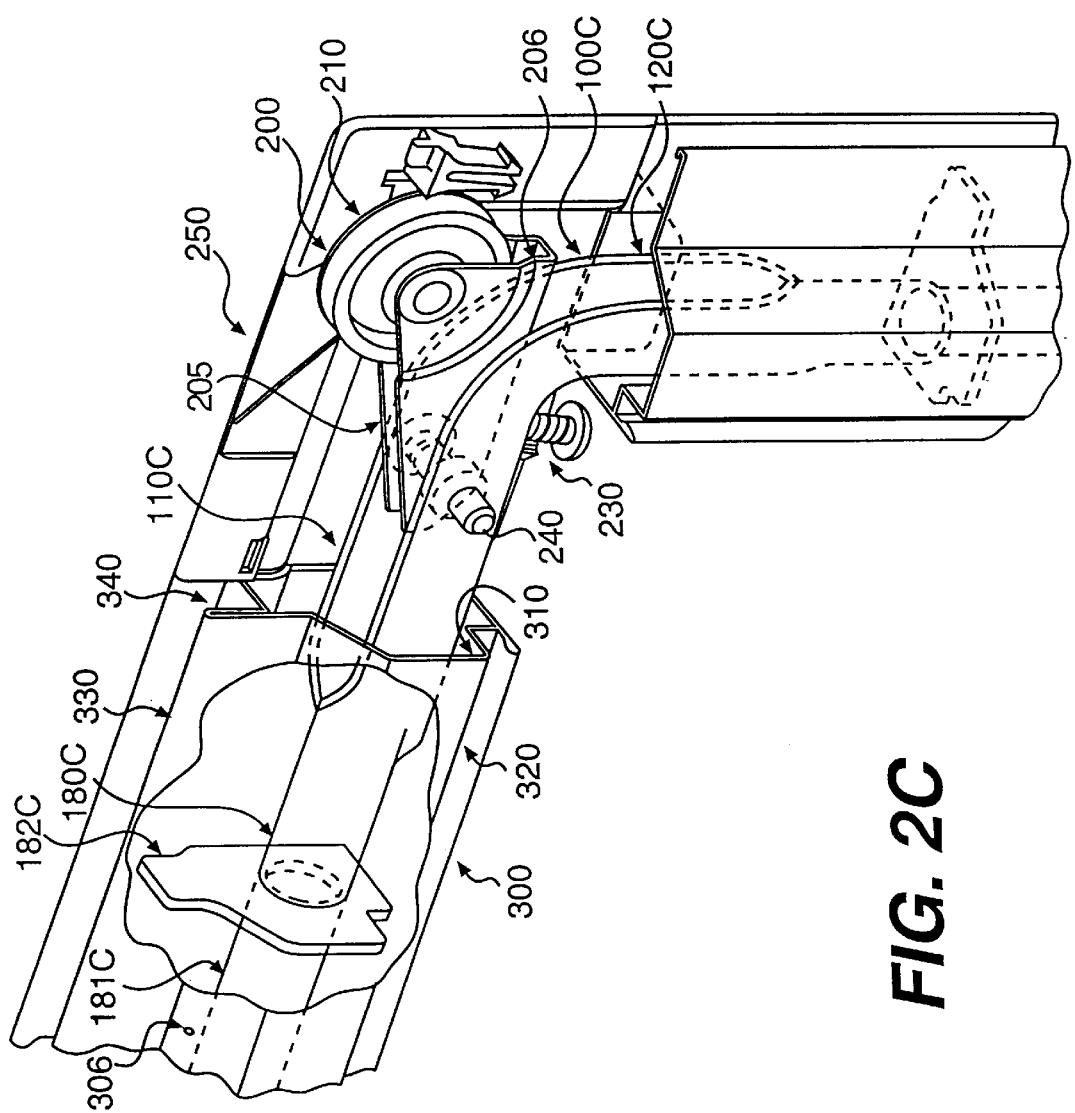
FIG. 2C is a partial cutaway, perspective view showing, as an alternate embodiment of this invention, another reinforcing channel and optional wheel assembly with a portion of the decorative cover for covering the wheel assembly.

FIG. 2C is a partial cutaway, perspective view showing, as an alternate embodiment of this invention, a reinforcing channel 100C and optional wheel assembly 200 with a portion of the decorative cover 250 for covering the wheel assembly 200. The reinforcing channel 100C can be made of the materials discussed above with respect to reinforcing channel 100A and reinforcing channel 100B. In this embodiment, the reinforcing channel 100C can be made of more than one piece, or several pieces, joined together. In one aspect, the reinforcing channel 100C can have a substantially U-shaped cross section and a bend at a desired angle such as approximately ninety degrees with the ends 180C of the channel 100C being crimped, roll-formed, knurled, welded or otherwise modified to secure extensions 181C, to constitute the first and second legs of the reinforcing channel 100C. In this embodiment, the extensions are made of standard three-eighths inch steel reinforcing bar. However, any suitable diameter or any suitable material can be used. Also, the extensions need not be circular in cross section. Rather, any suitable configuration can be used.

In this embodiment, if desired, each frame bar segment 300 can include a retainer 182C to limit or define the foamed region of the frame bar segment 100C. In manufacture, the retainer 182C slides on the extensions (e.g., reinforcing bar) 181C until it hits the modified end (e.g., the roll-formed or crimped section) 180C of the reinforcing channel 100C. In this embodiment, it is not necessary for the retainer 182C to provide a one hundred percent seal within the hollow interior portion of the frame bar 300. Rather, some leakage of the foamed material which results in the rigid reinforcing and structural material is acceptable. In this embodiment, by way of example, the reinforcing bar can be approximately eight inches in length, with approximately seven inches in length extending on one side of the retainer 182C to be secured by the rigid reinforcing and structural material, with approximately one inch being crimped or otherwise secured by the end 180C of the reinforcing channel 100C. Of course, one of skill in the art recognizes that other lengths can be utilized as desired.

When a retainer 182C is utilized, the foamed chemical is injected directly into the frame bar segment, in a manner discussed in more detail below, and is substantially retained therein by the retainer 182C. If an extension 181C is utilized with the retainer, the portion of the extension 181C opposite to the foamed side of the retainer 182C can be, if necessary, painted or otherwise treated chemically, for example, to protect against weathering, rust, corrosion and the like.

Figure 3:
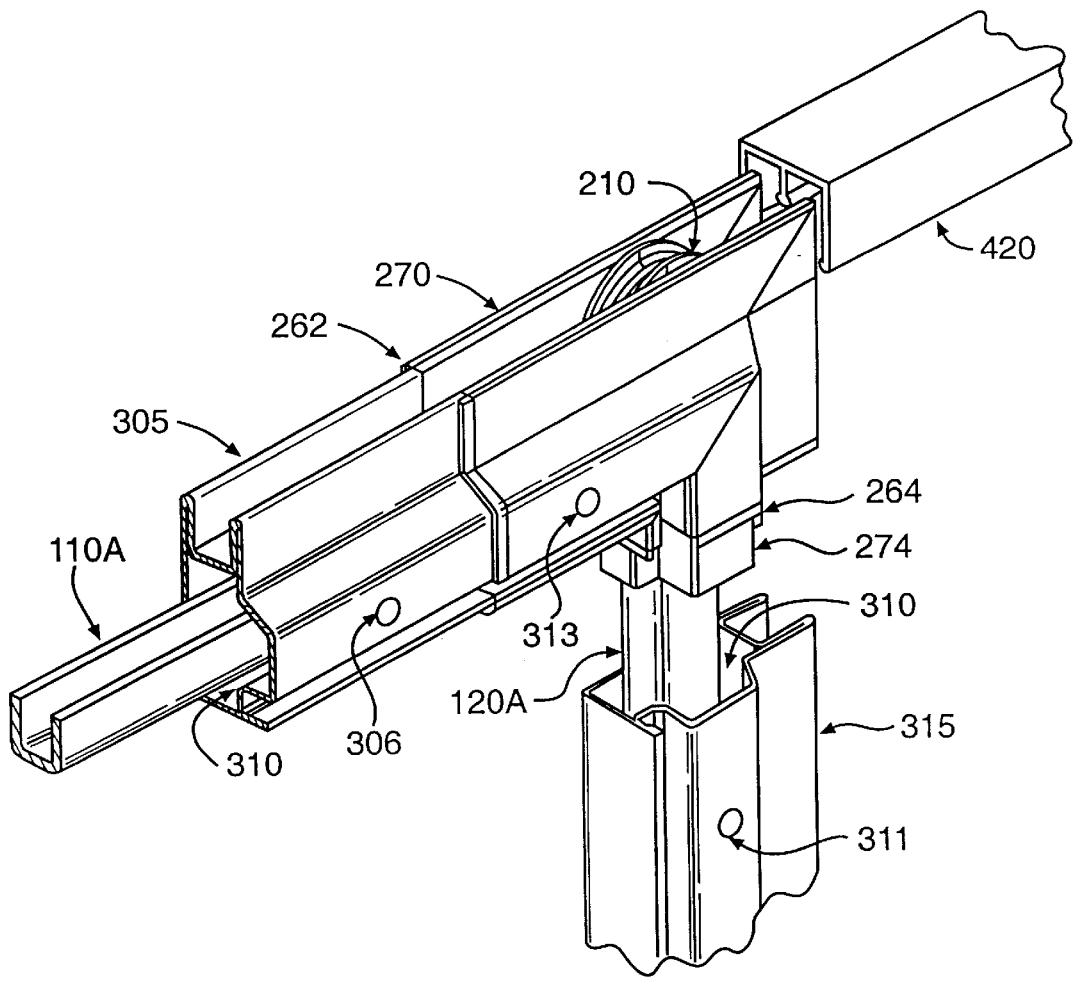
FIG. 3 shows a partially assembled view of one embodiment of the corner reinforcement of the present invention.

FIG. 3 shows a partially assembled view of one embodiment of the corner reinforcement of the present invention, in conjunction with the reinforcing channel 100A of FIG. 2B, discussed above, installed in a track 420 for guiding the frame. FIG. 3 shows the joining of a first segment 305 of frame bar to one end 262 of decorative cover 270. A second segment 315 of frame bar is secured to another end 264 of decorative cover 270. If utilized, connector caps 272 and 274 assist in securing frame bar segment 305 and frame bar segment 315 to decorative cover 270, respectively. If connector caps 272 and 274 are not utilized, then first frame bar segment 305 and second frame bar segment 315 are secured in respective recesses (for example, 262 shown in FIG. 2B) of decorative cover 270. FIG. 3 also shows that first frame bar segment 305 can optionally be provided with an insertion opening 306, while second frame bar segment 310 can optionally be provided with an insertion opening 311. These openings will be discussed in more detail below.

If desired, decorative cover 270 can be formed as a sealed unit when decorative side panels 250 and 260 are joined. In this instance, decorative cover 270 has a closed, hollow interior that is encased around wheel 210 and wheel assembly 205. Stop 254 of decorative side panel 250 assists in this encasing. In this configuration, decorative cover 270 also can optionally be provided with a corresponding insertion opening 313 for reasons that will be apparent from the discussion below.

FIG. 3 shows that a portion of the first leg 110A of the reinforcing channel 100A is inserted through a first end of the first frame bar segment 305 into and substantially spaced from a surface of the hollow interior portion 310 of the first frame bar segment 305 and a portion of the second leg 120A of the reinforcing channel 100A is inserted through a first end of the second frame bar segment 315 into and substantially spaced from the hollow interior portion 310 of the second segment. Of course, one having ordinary skill in the art recognizes that if the reinforcing channel 100A, for example, is made of separate pieces, rather than being unitary, then one or the other of the legs 110A/120A can be installed in the respective frame bar segments. This, of course, is also true for the other embodiments, such as the one shown in FIG. 2C.

FIG. 3 shows that the inserted portions of the reinforcing channel 100A are sufficiently spaced from the surfaces of the hollow interior portions of the frame bar segments 305 and 315 for allowing foamed chemical, prior to curing, to pass between the inserted portions and the surfaces of the hollow interior portions. This arrangement will be discussed in more detail below.

A probe or equivalent instrument can be inserted in insertion opening 306 of first frame bar segment 305 and insertion opening 311 of second frame bar segment 315 to inject a foamed material, such as polyurethane, urea formaldehyde or styrene, for example. Other equivalent materials could be used. In this manner, the foamed material can be injected in the respective insertion openings inside the hollow interior portion of the first frame bar segment 305 for securing the inserted portion of the first leg 110A of the reinforcing channel 100A therewithin and/or inside the hollow interior portion 310 of the second frame bar segment 315 for securing the inserted portion of the second leg 120A of the reinforcing channel 100A therewithin. Of course, if desired, the foamed material can be injected in one or the other of the frame bar segments independently, with or without injection into the other frame bar segment. It should be noted that the foamed material, upon curing, not only secures, but also orients the respective legs within the corresponding segments. In the embodiment of FIG. 2C, for example, the foamed material can be injected into opening 306 in frame bar segment 300 and can be substantially contained by retainer 182C. Retainer 182C can provide up to a one hundred percent seal, or less, if desired.

Returning to FIG. 3, rather than using insertion openings 306 and 311, the foamed material could be injected through guide trough 340. This is preferred, since the use of insertion openings 306 and 311 requires that decorative plugs (not shown) be installed to cover the openings. This tends to be less desirable from an aesthetic standpoint. By injecting the foamed material into the guide trough, the injection points are unobtrusive. Further, if desired, the foamed material can be injected in insertion opening 313 or through the guide trough in decorative cover 270 as an additional reinforcement to the corner. If connector caps 272 and 274 are omitted, or hollow connectors are utilized in conjunction with an otherwise sealed decorative cover 270, then the foamed material could be injected into the decorative cover 270 directly from the frame bar segments 305 and 315. It is important that the foamed material not interfere with either the wheel 210 or the wheel assembly 205. Therefore, these elements must be encased or sufficiently protected, as discussed above.

The foamed material or equivalent rigid reinforcing and structural material should have desirable characteristics for use in this invention. For example, I prefer that it have good adhesion properties so that it adheres to metal surfaces, such as the reinforcing channel and the frame bar segments. Also, it could potentially, but not necessarily, have the ability to adhere to the decorative cover. If desired, any material which can be easily manipulated in liquid or semi-liquid form, and which solidifies and remains solid at likely operating temperatures, could be used as the rigid reinforcing and structural material, such as, for example, concrete, cement, plaster, resin, wood-filled resin, hot melt resins, polymers and wood-filled polymers, and clay. However, due to their ease of production and manipulation, foamed chemicals are preferred. Further, I have found that the adhesion properties of foamed chemicals provide the ability to carry shear loads between the frame bar segments, for example, and the foamed chemical. Therefore, foamed chemicals are preferred for this reason, as well.

In this embodiment, the foamed material is initially a liquid and can be injected at a pressure anywhere between 50 to 4000 psi depending on the type of injector used. Although under this pressure, the foamed material is injected, almost poured into the frame bar segments, since it flows with a low viscosity. I have found that the liquid stops flowing after about 15 seconds, it foams, and then the foam expands until it reaches the limits of the reinforcing channel or the frame bar. In this regard, the reinforcing channel also could be provided with holes to assist the foamed material in reaching narrow spaces between the reinforcing channel and the frame bar. I have found that it is best that the foamed material expand, but not with a tremendous driving force. It may expand at a pressure of approximately 15 psi. Once injected, the foam typically expands until it hits the internal walls of the frame bar. Slight bulging of the frame bar may occur. Therefore, vent holes can be provided in the frame bar as necessary. The foamed material should be capable of withstanding temperatures between −40° C. and 70° C. Also, the foamed material should not contract upon curing.

I have found that the present invention provides sufficient strength and rigidity without "foaming" the decorative cover. Nevertheless, some may desire that this portion of the corner reinforcement have a consistent "sound" and "feel" as the remaining corner reinforcement. Therefore, I have provided for this aesthetic requirement, as will be discussed in more detail below.

This invention provides many options, depending upon the configuration of the frame bar segments and the decorative cover 270. In one aspect, if the decorative cover has a "pass-through" design, foamed material can be injected into one frame bar segment and pass through the decorative cover 270 into the other frame bar segment. Thus, the foamed material can travel around the corner of the corner reinforcement to encapsulate both ends of the reinforcing channel.

In another aspect, if retainer 182C or the connector caps 272 and 274 are utilized, the decorative cover 270 is isolated from the foamed material, since the retainer 182C or the connector caps 272 and 274 stop the penetration of the foamed material into the decorative cover 270. In turn, the decorative cover 270 can remain hollow or can be injected directly with the foamed material through its guide trough, through injection opening 313 or otherwise. It is also then necessary to foam the frame bar segments individually to encapsulate the legs of the reinforcement individually. This technique, which is preferred, will be discussed in more detail below.

In a variation, the corner reinforcement itself could provide the required injection port and passage-ways, to direct the injected foam to the necessary portions of the corner reinforcement. In this arrangement, the decorative cover 270 would have a modified "pass-through" design with suitable passage-ways so that the foaming material could be injected directly into the decorative cover 270 without interfering with either the wheel 210 or the wheel assembly 205. In this design, no insertion openings would be required in the sides of the frame bar or the decorative cover 270. Rather, the foaming material could be injected from the ends of and through the passage-ways of the decorative cover 270 along the legs of the reinforcement. The ends of the decorative cover 270 would then be capped unobtrusively and the wheel assembly 200 secured. In this design, there would be no visible indication that the corner reinforcement has been "foamed".

By way of example, standard patio doors have dimensions on the order of thirty-four to thirty-six inches in width and seventy-four inches in height. I prefer that the legs of the corner reinforcement extend into the frame bar with a length of each leg being between 4 to 12 inches. It is more preferred to use legs 6 inches in length. Legs longer than 12 inches can be used, but cost then becomes a factor. If, however, the legs are made too short, I have found that the cured, foamed material cannot handle the loading, since the lever force is high, whereas the longer dimensions transmit the loads across a greater distance. Thus, more distributive loading is achieved with longer leg lengths.

It is known that, for a bar supported at one end (i.e., a cantilevered bar), a bar 3 feet in length will bend by an amount relative to a bar (made of identical material) 2 feet in length by $3^3/2^3$. Thus, deflection of the cantilevered bar increases significantly with length. I determine an optimum length of the legs of the corner reinforcement based in part on this relationship. By increasing the length of the legs, I shorten the length of any unsupported (unreinforced) profile, by the cubic relationship noted above.

Figure 4:
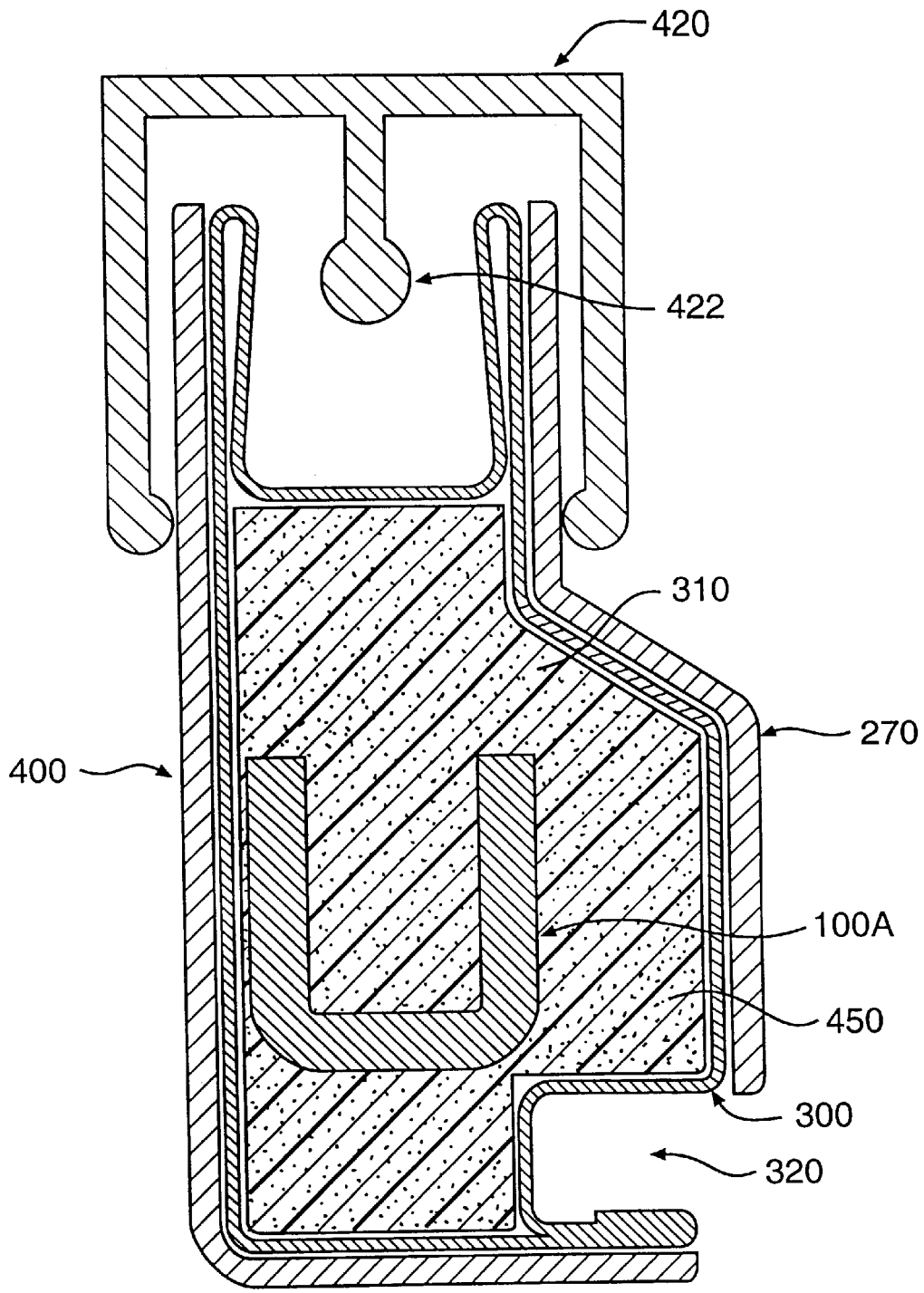
FIG. 4 shows a cross-sectional view of one embodiment of the corner reinforcement of the present invention, taken generally along line IV—IV of FIG. 5.
Figure 5:
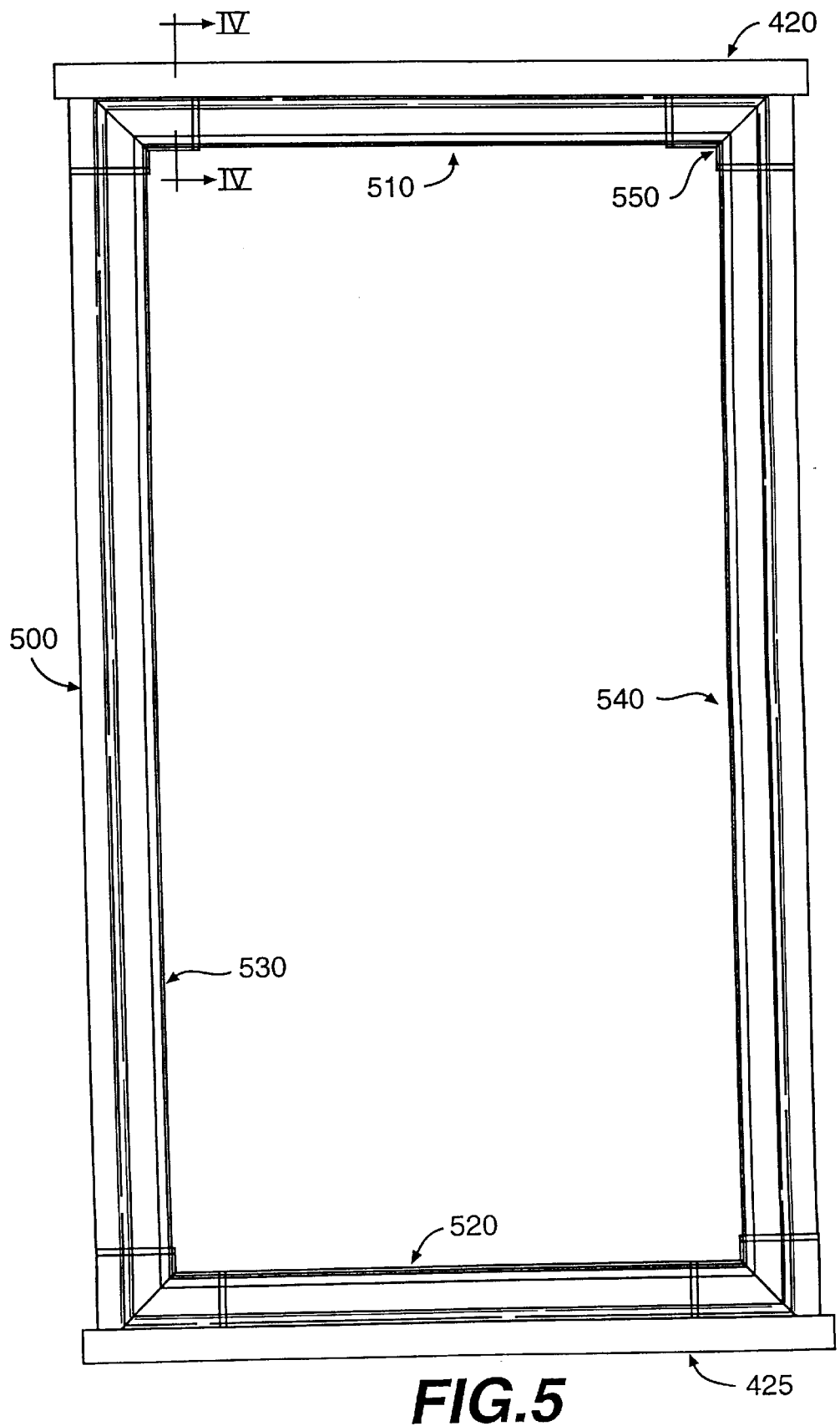
FIG. 5 shows an assembled view of a frame including the structural corner reinforcements of the present invention.

FIG. 4 shows a cross-sectional view of one embodiment of the corner reinforcement of the present invention, taken generally along line IV—IV of FIG. 5. FIG. 4 shows a portion of frame assembly 400 that includes a reinforcing channel 100A, in this embodiment, which is secured and oriented within rigid reinforcing and structural material 450, such as solidified polyurethane foam. Frame assembly 400 is guided in track 420 along guide 422. In FIG. 4, the foamed material has been injected into decorative cover 270. FIG. 4 shows that reinforcing channel 100A is substantially spaced from the surfaces of hollow interior portion 310 of the frame bar segment 300. In fact, a cross section of the reinforcing channel 100A is significantly smaller than a cross section of the hollow interior portion 310 of the frame bar segment 300 for allowing the foamed chemical to pass between the reinforcing channel and the surface of the hollow interior portions. This arrangement, upon curing of the foamed chemical, assists in distributing the loading along the corner reinforcement. Of course, it is acceptable if the reinforcing channel 100A contacts a side wall of the frame bar segment 300, since this will not detract from the distributed loading. Nevertheless, it is important that the inserted portions (e.g., the legs) of the reinforcing channel be sufficiently spaced from the surfaces of the hollow interior portions of the frame bar segments for allowing passage of the foamed material, prior to curing.

FIG. 5 shows a frame 500 that includes the structural corner reinforcements of the present invention. The frame 500 is guided in tracks 420 and 425. FIG. 5 shows first and second short frame bar segments 510 and 520 and first and second long frame bar segments 530 and 540, each of which is formed into a desired profile and each has a hollow interior portion. In this embodiment, each of the four corners has been reinforced using the corner reinforcements of the present invention. Notably, the frame 500 utilizes four reinforcing channels 1000A, 100B or 100C, each having a first leg and a second leg arranged at an angle to the first leg. (In this embodiment, the desired angle is approximately ninety degrees.) A portion of the first leg of a respective reinforcing channel is inserted through an end of short frame bar is segment 510/520 into and substantially spaced from a surface of the hollow interior portion of the short segment and a portion of the second leg of a respective reinforcing channel is inserted through an end of each long screen bar segment 530/540 into and substantially spaced from a surface of the hollow interior portion of the long segment. A rigid reinforcing and structural material 450 (as shown in FIG. 4), formed from a foamed chemical, is inside the hollow interior portion of each short segment for securing and orienting respective inserted portions of the first legs of the reinforcing channels therewithin and the hollow interior portion of each long segment for securing and orienting respective inserted portions of the second legs of the reinforcing channels therewithin.

In making a frame 500 including such structural corner reinforcements, first and second short segments of frame bar and first and second long segments of frame bar are provided, each segment being formed into a desired profile and each having a hollow interior portion. Four reinforcing channels 100A, 100B or 100C are also provided, each having a first leg and a second leg arranged at approximately ninety degrees to the first leg. A portion of the first leg of a respective reinforcing channel is inserted through an end of a short segment 510/520 of the frame bar into and substantially spaced from a surface of the hollow interior portion of the short segment 510/520. A portion of the second leg of a respective reinforcing channel is inserted through an end of a long segment 530/540 of the frame bar into and substantially spaced from a surface of the hollow interior portion of the long segment 530/540. As discussed above, the inserted portions of the reinforcing channel should be sufficiently spaced from the surfaces of the hollow interior portions of the frame bar segments for allowing passage of the foamed material, prior to curing.

Although it is preferred to reinforce both long and short segments of each of the four corners, it is recognized that not all four corners need to be reinforced, and not all segments of the corners need to be reinforced, if this is desired for a particular application. Rather, individual legs or particular corners could be reinforced, as desired, using the concepts of the present invention.

It is preferred to use a corner reinforcement that allows square cut ends, as has been shown herein, since less frame bar material is required and the corner reinforcement can be designed to allow a close fitting connection between the corner reinforcement and the decorative cover, for example. However, if desired, corner reinforcements allowing miter (e.g., forty-five degree) cuts can be used.

After the reinforcing channel is inserted into respective frame segments, the members are clamped rigid. The entire assembly (four corners) can be clamped together, or the corners can be assembled singularly or in pairs.

Preferably, a metered amount of premixed liquid polyurethane foam (or other suitable foaming material or equivalent) is injected through an injection opening into the interior of the corner reinforcement. I prefer to inject the foaming material into the middle of the short sides of the frame bar segments, through the guide trough, with the short sides in a substantially horizontal position. This allows distribution of the foamed material throughout the length of the short sides. I drill a hole in the guide trough, inject the material for approximately one second, the injected material hits the bottom of the section and flows to either end, and I then insert a temporary plug. Upon curing of the foamed material, the plug is removed and reused. For the long sides of the segments, I have found that arranging the segments at approximately ten degrees from horizontal is preferred, so that the foamed material is injected at approximately two thirds of the way up from the bottom of the bar. I have found that the foamed material will travel up the one third under pressure, and down the two thirds by pressure and gravity.

I prefer to use foaming material sold under the tradename Vultafoam and supplied by General Latex Canada Inc. This material becomes rigid after approximately ninety seconds. However, any equivalent foaming material, which cures after five seconds or up to five minutes can be used as desired. This injection can be performed using any of the various techniques discussed above, such as through the frame bar segments, alone, or in combination with the decorative cover, or solely through the decorative cover, either from the side, or end-wise. Sufficient chemical is injected to result in orientation and securing of the insert, after the polyurethane (or other foaming material) has fully expanded and cured. I prefer a density of about six to nine lbs/ft$^3$ after the material becomes rigid. This density should be above 2.5 lbs/ft$^3$ to avoid excessive shrinkage at low temperatures. To substantially fill each short segment, about 28 to 34 grams of material would be required, depending on the material and types of legs used, whereas to substantially fill each long segment, about 70 grams of material would be required. Of course, it is recognized that it is not necessary to substantially fill these segments in order to achieve the desired results of this invention. Nevertheless, if desired, most clearances can be filled between the inserted portion of the legs of the reinforcing channel and the interior of the frame bar by passing through the spacing between the inserted legs of the corner reinforcement and the frame segments. This thus eliminates any initial play in the corner reinforcement.

As discussed above, the rigidity of the corner is enhanced by using reinforcing channels that have legs as long as is practical. By extending the corner reinforcements deeper into the frame segments, the loading at the corner is distributed over a larger area, thus reducing localized stresses, making the corner reinforcement stronger and stiffer. Furthermore, unreinforced spans are reduced or eliminated.

After the foam has cured in the corner assembly, a rigid connection and distributed loading results, since the cured, foamed material intimately contacts all loading areas. As the foam expands in the clearance gaps, the foam exerts a distributed force on these loading areas, in effect, preloading the connection, and increasing stiffness further.

I have found that the structural corner reinforcement of this invention and frames made using such corner reinforcements have many advantages over conventional arrangements. In particular, the structural corner reinforcement of this invention results in a stiffer, stronger "frame bar" for forming frames. This is true both in bending and torsion. I believe that the shear strength of the frame bar is also increased, thus improving mechanical properties overall. This improvement in mechanical properties allows for a reduction in frame gauge (thickness) and thus lowers cost. The cost of adding the rigid foam is less than the savings from the gauge reduction to yield a net cost reduction. Thus, this invention results in cost reduction with significantly increased performance.

There are additional benefits. This invention provides increased dent resistance and increased localized buckling resistance of the typically roll-formed frame material. Also, locking of the frame bar joint or seam is less critical, since the expanded rigid foam improves overall integrity of the profile and increases torsional stiffness and strength. Also, the harder, thinner typically roll-formed material allows for tighter bends on the profile without stressing and cracking any paint on the surface. This improves aesthetics, and corrosion resistance of the product when the frame is made of steel. Further, the final assembly has significantly enhanced consumer appeal. The "feel" of the final assembly is denser and less "tinny" than conventional assemblies. This means that the sound of a patio door, for example, utilizing this invention is quieter during rolling as it is opened and closed than when conventional doors are used.

The corner reinforcement of this invention provides an integral, rigid, rectangular, polygonal or other geometrically-shaped frame or frame section. Such a frame is ideally suited when (1) rigidity and low cost are important, and (2) the frame need not be supported by any material within the opening portion of the frame and/or (3) the frame is point supported and must retain frame rigidity without other perimeter supporting elements. Examples implementing this primary characteristic include, but are not limited to, sliding patio screen doors, hinged (pivoting) screen doors, hinged (pivoting) screen shutters, hinged (pivoting) window screens, bi-fold panels, doors, window screens or window shutters, geodesic protective screen structures and a double hung window-single screen system.

Rather than using the frame to support screen, for example, the frame could support any other flexible or semi-flexible material such as woven or knitted fabrics, flexible plastic films, meshes and the like. Thus, the present invention also can provide lightweight, movable panels for purposes such as aesthetics, light barriers, air barriers or moisture barriers. Because of the capabilities provided by the stronger corners, all of these applications can be designed for sizes greater than current systems, yet at economical costs.

The present invention, as a secondary characteristic, also can be utilized when an internal panel exists within the frame, in which the panel is rigid, but does not provide support to the frame in all directions. This may occur in systems in which the panel moves or is removable, or slides within the frame. In such a case, a frame or frame section utilizing the present invention is capable of providing more support to such a panel than current systems. Examples of such products include, but are not limited to, pivoting or hinged storm doors and pivoting or hinged, combination storm and screen doors.

There also may be instances when an internal panel exists within the frame, in which the panel is rigid enough to provide support to the frame, but the internal panel must be reduced in thickness for cost or other considerations. The present invention provides an added benefit by allowing the thickness of the panel to be reduced or the type of material to be changed, if desired, because the frame or frame section itself is capable of providing more support to the internal panel than current systems provide. By way of example, and not limitation, such products may include sliding shower doors having a reduced thickness panel, sliding shower doors with an alternative panel material and window shutters.

Thus, the structural corner reinforcement of this invention provides many advantages in addition to strengthening frames or frame sections.

The scope of the invention is not limited by the discussion above, but only by each of the following claims, which should be interpreted as broadly as possible to encompass all modifications and equivalent structures without encompassing the prior art or invalidating the claim.

I claim:

1. A structural corner reinforcement for strengthening frames, said reinforcement comprising:
    at least a first segment and a second segment of frame bar, each formed into a desired profile and each having a hollow interior portion;
    a reinforcing channel having a first leg and a second leg arranged at an angle to the first leg, with ends of the channel securing first and second extensions to extend the first and second legs, respectively, at least one of (i) a portion of the first extension of the reinforcing channel being inserted through a first end of the first segment of the frame bar into and substantially spaced from all surfaces of the hollow interior portion of the first segment and (ii) a portion of the second extension of the reinforcing channel being inserted through a first end of the second segment of the frame bar into and substantially spaced from all surfaces of the hollow interior portion of the second segment; and
    a rigid reinforcing and structural material, formed from a foamed chemical, inside at least one of (i) the hollow interior portion of the first segment for securing the inserted portion of the first extension of the reinforcing channel therewithin and (ii) the hollow interior portion of the second segment for securing the inserted portion of the second extension of the reinforcing channel therewithin.

2. A reinforcement according to claim 1, in which the inserted portions of the reinforcing channel are sufficiently spaced from the surfaces of the hollow interior portions of the frame bar segments for allowing the foamed chemical, prior to curing, to pass between the inserted portions and the surfaces of the hollow interior portions.

3. A reinforcement according to claim 1, in which each of the first and second segments of frame bar have a recess for securing screen therein and are made of a material selected from the group consisting of extruded aluminum, roll-formed aluminum, roll-formed sheet steel, extruded plastic and pultruded, glass-reinforced thermosetting resin.

4. A reinforcement according to claim 1, in which the reinforcing channel is a unitary piece having a bend of approximately ninety degrees to form the first and second legs and a cross section of one of substantially U-shape and substantially Z-shape.

5. A reinforcement according to claim 1, in which the reinforcing channel is one of plated steel and high strength plastic.

6. A reinforcement according to claim 1, in which a cross section of the reinforcing channel is significantly smaller than a cross section of the hollow interior portions of the first and second segments of frame bar for allowing the foamed chemical, prior to curing, to pass between the reinforcing channel and surfaces of the hollow interior portions.

7. A reinforcement according to claim 1, further comprising a wheel mechanism secured to one of the first and second legs of the reinforcing channel, the wheel mechanism including a wheel for being guided in a track.

8. A reinforcement according to claim 7, in which the center line of the wheel mechanism is aligned with the center line of the one of the first and second legs of the reinforcing channel to which the wheel mechanism is secured.

9. A reinforcement according to claim 7, further comprising decorative side panels for enclosing the wheel mechanism.

10. A reinforcement according to claim 1, in which each of the first and second segments of frame bar include injection apertures, and the structural material is polyurethane foaming material having been injected into the first and second segments through the injection apertures and solidified.

11. A reinforcement according to claim 1, in which the reinforcing channel has a substantially U-shaped cross section and a bend of approximately ninety degrees.

12. A reinforcement according to claim 11, in which the reinforcing channel is one of plated steel and high strength plastic, and the extensions are steel reinforcing bar.

13. A reinforcement according to claim 11, further comprising a retainer within at least one of the first segment and the second segment of frame bar, for substantially containing the rigid reinforcing and structural material within the respective frame bar segment.

14. A frame including structural corner reinforcements, said frame comprising:
    first and second short segments of frame bar and first and second long segments of frame bar, each segment being formed into a desired profile and each having a hollow interior portion;
    four reinforcing channels, each reinforcing channel having a first leg and a second leg arranged at an angle to the first leg, with ends of each channel securing first and second extensions to extend the first and second legs, respectively, at least one of (i) a portion of the first extension of a respective reinforcing channel being inserted through an end of each short segment of the frame bar into and substantially spaced from all surfaces of the hollow interior portion of the short segment and (ii) a portion of the second extension of a respective reinforcing channel being inserted through an end of each long segment of the frame bar into and substantially spaced from all surfaces of the hollow interior portion of the long segment; and
    a rigid reinforcing and structural material, formed from a foamed chemical, inside at least one of (i) the hollow interior portion of each short segment for securing respective inserted portions of the first extensions of the reinforcing channels therewithin and (ii) the hollow interior portion of each long segment for securing respective inserted portions of the second extensions of the reinforcing channels therewithin.

15. A frame according to claim 14, in which the inserted portions of the reinforcing channel are sufficiently spaced from the surfaces of the hollow interior portions of the frame bar segments for allowing the foamed chemical, prior to curing, to pass between the inserted portions and the surfaces of the hollow interior portions.

16. A frame according to claim 14, in which each of the segments of frame bar have a recess for securing screen therein and are made of a material selected from the group consisting of extruded aluminum, roll-formed aluminum, roll-formed sheet steel, extruded plastic and pultruded, glass-reinforced thermosetting resin.

17. A frame according to claim 14, in which each reinforcing channel is a unitary piece having a bend at approximately ninety degrees to form the first and second legs and a cross section of one of substantially U-shape and substantially Z-shape.

18. A frame according to claim 14, in which each reinforcing channel is one of plated steel and high strength plastic.

19. A frame according to claim 14, in which a cross section of each reinforcing channel is significantly smaller than a cross section of the hollow interior portions of the segments of frame bar for allowing the foamed chemical, prior to curing, to pass between the reinforcing channel and surfaces of the hollow interior portions.

20. A frame according to claim 14, further comprising a wheel mechanism secured to a respective first leg of each reinforcing channel, the wheel mechanism including a wheel for being guided in a track of the frame.

21. A frame according to claim 20, in which the center line of the wheel mechanism is aligned with the center line of the first legs of the reinforcing channel to which the wheel mechanism is secured.

22. A frame according to claim 20, further comprising decorative side panels for enclosing each wheel mechanism.

23. A frame according to claim 14, in which each of the segments of frame bar includes injection apertures, and the structural material is polyurethane foaming material having been injected into each of the segments through the injection apertures and solidified.

24. A frame according to claim 14, in which the reinforcing channel has a substantially U-shaped cross section and a bend of approximately ninety degrees.

25. A frame according to claim 24, in which the reinforcing channel is one of plated steel and high strength plastic, and the extensions are steel reinforcing bar.

26. A frame according to claim 24, further comprising a retainer within at least one of the first segment and the second segment of frame bar, for substantially containing the rigid reinforcing and structural material within the respective frame bar segment.

27. A method of making a structural corner reinforcement for strengthening frames, said method comprising:

providing at least a first segment and a second segment of frame bar, each being formed into a desired profile and each having a hollow interior portion;

providing a reinforcing channel having a first leg and a second leg arranged at an angle to the first leg, with ends of the channel securing first and second extensions to extend the first and second legs, respectively;

inserting a portion of the first extension of the reinforcing channel through a first end of the first segment of the frame bar into and substantially spaced from all surfaces of the hollow interior portion of the first segment;

inserting a portion of the second extension of the reinforcing channel through a first end of the second segment of the frame bar into and substantially spaced from all surfaces of the hollow portion of the second segment; and injecting, with a reinforcing and structural material, at least one of (i) the hollow interior portion of the first segment for securing the inserted portion of the first extension of the reinforcing channel therewithin and (ii) the hollow interior portion of the second segment for securing the inserted portion of the first extension of the reinforcing channel therewithin.

28. A method according to claim 27, in which the inserted portions of the reinforcing channel are sufficiently spaced from the surfaces of the hollow interior portions of the frame bar segments for allowing the foamed chemical, prior to curing, to pass between the inserted portions and the surfaces of the hollow interior portions.

29. A method according to claim 27, in which each of the first and second segments of frame bar have a recess for securing screen therein and are made of a material selected from the group consisting of extruded aluminum, roll-formed aluminum, roll-formed sheet steel, extruded plastic and pultruded, glass-reinforced thermosetting resin.

30. A method according to claim 27, in which the reinforcing channel is a unitary piece having a bend at approximately ninety degrees to form the first and second legs and a cross section of one of substantially U-shape and substantially Z-shape.

31. A method according to claim 27, in which the reinforcing channel is one of plated steel and high strength plastic.

32. A method according to claim 27, in which a cross section of the reinforcing channel is significantly smaller than a cross section of the hollow interior portions of the first and second segments of frame bar for allowing the foamed chemical, prior to curing, to pass between the reinforcing channel and surfaces of the hollow interior portions.

33. A method according to claim 27, further comprising securing a wheel mechanism to one of the first and second legs of the reinforcing channel, the wheel mechanism including a wheel for being guided in a track.

34. A method according to claim 33, further comprising aligning the center line of the wheel mechanism with the center line of the one of the first and second legs of the reinforcing channel to which the wheel mechanism is secured.

35. A method according to claim 33, further comprising enclosing the wheel mechanism with decorative side panels.

36. A method according to claim 27, in which the first and second segments of frame bar each include injection apertures, and the structural material is polyurethane foaming material which is injected in said injecting step into the first and second segments through the injection apertures and cured.

37. A method according to claim 27, in which the reinforcing channel has a substantially U-shaped cross section and a bend of approximately ninety degrees.

38. A method according to claim 37, in which the reinforcing channel is one of plated steel and high strength plastic, and the extensions are steel reinforcing bar.

39. A method according to claim 37, further comprising providing a retainer within at least one of the first segment and the second segment of frame bar, for substantially containing the rigid reinforcing and structural material within the respective frame bar segment.

40. A method of making a frame including structural corner reinforcements, said method comprising:

providing first and second short segments of frame bar and first and second long segments of frame bar, each segment being formed into a desired profile and each having a hollow interior portion;

providing four reinforcing channels, each channel having a first leg and a second leg arranged at an angle to the first leg, with ends of each channel securing first and second extensions to extend the first and second legs, respectively;

inserting a portion of the first extension of a respective reinforcing channel through an end of a short segment of the frame bar into and substantially spaced from all surfaces of the hollow interior portion of the short segment;

inserting a portion of the second extension of a respective reinforcing channel through an end of a long segment of the frame bar into and substantially spaced from all surfaces of the hollow interior portion of the long segment; and injecting, with a reinforcing and structural material, at least one of (i) the hollow interior portions of the short segments for securing respective inserted portions of the first extensions of the reinforcing channels therewithin and (ii) the hollow interior portions of the long segments for securing respective inserted portions of the second extensions of the reinforcing channels therewithin.

41. A method according to claim 40, in which the inserted portions of the reinforcing channel are sufficiently spaced from the surfaces of the hollow interior portions of the frame bar segments for allowing the foamed chemical, prior to curing, to pass between the inserted portions and the surfaces of the hollow interior portions.

42. A method according to claim 40, in which each of the segments of frame bar have a recess for securing screen therein and are made of a material selected from the group consisting of extruded aluminum, roll-formed aluminum, roll-formed sheet steel, extruded plastic and pultruded, glass-reinforced thermosetting resin.

43. A method according to claim 40, in which each reinforcing channel is a unitary piece having a bend at approximately ninety degrees to form the first and second legs and a cross section of one of substantially U-shape and substantially Z-shape.

44. A method according to claim 40, in which each reinforcing channel is one of plated steel and high strength plastic.

45. A method according to claim 40, in which a cross section of each reinforcing channel is significantly smaller than a cross section of the respective hollow interior portions of the segments of frame bar for allowing the foamed chemical, prior to curing, to pass between the reinforcing channel and surfaces of the hollow interior portions.

46. A method according to claim 40, further comprising securing a wheel mechanism to a respective first leg of each reinforcing channel, the wheel mechanism including a wheel for being guided in a track of the frame.

47. A method according to claim 46, further comprising aligning the center line of the wheel mechanism with the center line of a respective leg of the reinforcing channel to which the wheel mechanism is secured.

48. A method according to claim 46, further comprising enclosing the wheel mechanism with decorative side panels.

49. A method according to claim 40, in which each segment of frame bar includes injection apertures, and the structural material is polyurethane foaming material which is injected in said injecting step into each of the segments through the injection apertures and cured.

50. A method according to claim 40, in which the reinforcing channel has a substantially U-shaped cross section and a bend of approximately ninety degrees.

51. A method according to claim 50, in which the reinforcing channel is one of plated steel and high strength plastic, and the extensions are steel reinforcing bar.

52. A method according to claim 50, further comprising providing a retainer within at least one of the first segment and the second segment of frame bar, for substantially containing the rigid reinforcing and structural material within the respective frame bar segment.

53. A structural corner reinforcement for use in strengthening frames, said reinforcement comprising:

at least a first segment and a second segment of frame bar, each formed into a desired profile and each having a hollow interior portion;

a reinforcing channel having a first leg and a second leg arranged at an angle to the first leg, at least one of (i) a portion of the first leg of the reinforcing channel being inserted through a first end of the first segment of the frame bar into and substantially spaced from all surfaces of the hollow interior portion of the first segment and (ii) a portion of the second leg of the reinforcing channel being inserted through a first end of the second segment of the frame bar into and substantially spaced from all surfaces of the hollow interior portion of the second segment; and a rigid reinforcing and structural material, formed from a foamed chemical, selectively provided inside at least a portion of at least one of (i) the hollow interior portion of the first segment for securing the inserted portion of the first leg of the reinforcing channel therewithin and (ii) the hollow interior portion of the second segment for securing the inserted portion of the second leg of the reinforcing channel therewithin, wherein a respective inserted portion of the reinforcing channel is sufficiently spaced from the surfaces of the hollow interior portion of a corresponding screen bar segment to allow the foamed chemical, prior to solidifying, to pass between the inserted portion and the surfaces of the hollow interior portion.

54. A reinforcement according to claim 53, in which each of the first and second segments of frame bar has a recess for securing screen therein and is made of a material selected from the group consisting of extruded aluminum, roll-formed aluminum, roll-formed sheet steel, extruded plastic and pultruded, glass-reinforced thermosetting resin.

55. A reinforcement according to claim 53, in which the reinforcing channel is a unitary piece having a bend of approximately ninety degrees to form the first and second legs and a cross section of one of substantially U-shape and substantially Z-shape.

56. A reinforcement according to claim 53, in which the reinforcing channel is one of plated steel and high strength plastic.

57. A reinforcement according to claim 53, in which a cross section of the reinforcing channel is significantly smaller than a cross section of the hollow interior portions of the first and second segments of frame bar for allowing the foamed chemical, prior to solidifying, to pass between the reinforcing channel and surfaces of the hollow interior portions.

58. A reinforcement according to claim 53, further comprising a wheel mechanism secured to one of the first and second legs of the reinforcing channel, the wheel mechanism including a wheel for being guided in a track.

59. A reinforcement according to claim 58, in which the center line of the wheel mechanism is aligned with the center line of the one of the first and second legs of the reinforcing channel to which the wheel mechanism is secured.

60. A reinforcement according to claim 58, further comprising decorative side panels for enclosing the wheel mechanism.

61. A reinforcement according to claim 53, in which each of the first and second segments of frame bar includes injection apertures, and the structural material is polyurethane foaming material having been injected into the first and second segments through the injection apertures and solidified.

62. A frame including structural corner reinforcements, said frame comprising:

first and second short segments of frame bar and first and second long segments of frame bar, each segment being formed into a desired profile and each having a hollow interior portion;

four reinforcing channels, each having a first leg and a second leg arranged at an angle to the first leg, at least one of (i) a portion of the first leg of a respective reinforcing channel being inserted through an end of a short segment of the frame bar into and substantially spaced from all surfaces of the hollow interior portion of the short segment and (ii) a portion of the second leg of a respective reinforcing channel being inserted through an end of a long segment of the frame bar into and substantially spaced from all surfaces of the hollow interior portion of the long segment; and a rigid reinforcing and structural material, formed from a foamed chemical, selectively provided inside at least a portion of at least one of (i) the hollow interior portion of each short segment for securing respective inserted portions of the first legs of the reinforcing channels therewithin and (ii) the hollow interior portion of each long segment for securing respective inserted portions of the second legs of the reinforcing channels therewithin, wherein a respective inserted portion of the reinforcing channel is sufficiently spaced from the surfaces of the hollow interior portion of a respective screen bar segment to allow the foamed chemical, prior to solidifying, to pass between the inserted portion and the surfaces of the hollow interior portion.

63. A frame according to claim 62, in which each of the segments of frame bar has a recess for securing screen therein and is made of a material selected from the group consisting of extruded aluminum, roll-formed aluminum, roll-formed sheet steel, extruded plastic and pultruded, glass-reinforced thermosetting resin.

64. A frame according to claim 62, in which each reinforcing channel is a unitary piece having a bend at approximately ninety degrees to form the first and second legs and a cross section of one of substantially U-shape and substantially Z-shape.

65. A frame according to claim 62, in which each reinforcing channel is one of plated steel and high strength plastic.

66. A frame according to claim 62, in which a cross section of each reinforcing channel is significantly smaller than a cross section of the hollow interior portions of the segments of frame bar for allowing the foamed chemical, prior to solidifying, to pass between the reinforcing channel and surfaces of the hollow interior portions.

67. A frame according to claim 62, further comprising a wheel mechanism secured to a respective first leg of each reinforcing channel, the wheel mechanism including a wheel for being guided in a track.

68. A frame according to claim 67, in which the center line of the wheel mechanism is aligned with the center line of the first legs of the reinforcing channel to which the wheel mechanism is secured.

69. A frame according to claim 67, further comprising decorative side panels for enclosing each wheel mechanism.

70. A frame according to claim 62, in which each of the segments of frame bar includes injection apertures, and the structural material is polyurethane foaming material having been injected into each of the segments through the injection apertures and solidified.

71. A method of making a structural corner reinforcement for use in strengthening frames, said method comprising:

providing at least a first segment and a second segment of frame bar, each being formed into a desired profile and each having a hollow interior portion;

providing a reinforcing channel having a first leg and a second leg arranged at an angle to the first leg;

inserting a portion of the first leg of the reinforcing channel through a first end of the first segment of the screen bar into and substantially spaced from all surfaces of the hollow interior portion of the first segment, the inserted portion of the reinforcing channel being sufficiently spaced from the surfaces of the hollow interior portion of the frame bar segment to allow foamed chemical, prior to solidifying, to pass between the inserted portion and the surfaces of the hollow interior portion;

inserting a portion of the second leg of the reinforcing channel through a first end of the second segment of the screen bar into and substantially spaced from all surfaces of the hollow portion of the second segment, the inserted portion of the reinforcing channel being sufficiently spaced from the surfaces of the hollow interior portion of the screen bar segment to allow foamed chemical, prior to solidifying, to pass between the inserted portion and the surfaces of the hollow interior portion; and selectively injecting, with a reinforcing and structural material, at least a portion of at least one of (i) the hollow interior portion of the first segment for securing the inserted portion of the first leg of the reinforcing channel therewithin and (ii) the hollow interior portion of the second segment for securing the inserted portion of the first leg of the reinforcing channel therewithin.

72. A method according to claim 71, in which each of the first and second segments of frame bar has a recess for securing screen therein and is made of a material selected from the group consisting of extruded aluminum, roll-formed aluminum, roll-formed sheet steel, extruded plastic and pultruded, glass-reinforced thermosetting resin.

73. A method according to claim 71, in which the reinforcing channel is a unitary piece having a bend at approximately ninety degrees to form the first and second legs and a cross section of one of substantially U-shape and substantially Z-shape.

74. A method according to claim 71, in which the reinforcing channel is one of plated steel and high strength plastic.

75. A method according to claim 71, in which a cross section of the reinforcing channel is significantly smaller than a cross section of the hollow interior portions of the first and second segments of frame bar for allowing the foamed chemical, prior to solidifying, to pass between the reinforcing channel and surfaces of the hollow interior portions.

76. A method according to claim 71, further comprising securing a wheel mechanism to one of the first and second legs of the reinforcing channel, the wheel mechanism including a wheel for being guided in a track.

77. A method according to claim 76, further comprising aligning the center line of the wheel mechanism with the center line of the one of the first and second legs of the reinforcing channel to which the wheel mechanism is secured.

78. A method according to claim 76, further comprising enclosing the wheel mechanism with decorative side panels.

79. A method according to claim 71, in which the first and second segments of frame bar each includes injection apertures, and the structural material is polyurethane foaming material which is injected in said injecting steps into the first and second segments through the injection apertures and solidified.

80. A method of making a frame including structural corner reinforcements, said method comprising:

providing first and second short segments of frame bar and first and second long segments of frame bar, each segment being formed into a desired profile and each having a hollow interior portion;

providing four reinforcing channels, each having a first leg and a second leg arranged at an angle to the first leg;

inserting a portion of the first leg of a respective reinforcing channel through an end of a short segment of the frame bar into and substantially spaced from all surfaces of the hollow interior portion of the short segment, the inserted portion of the reinforcing channel being sufficiently spaced from the surfaces of the hollow interior portion of the frame bar segment to allow foamed chemical, prior to solidifying, to pass between the inserted portion and the surfaces of the hollow interior portion;

inserting a portion of the second leg of a respective reinforcing channel through an end of a long segment of the frame bar into and substantially all spaced from surfaces of the hollow interior portion of the long segment, the inserted portion of the reinforcing channel being sufficiently spaced from the surfaces of the hollow interior portion of the frame bar segment to allow foamed chemical, prior to solidifying, to pass between the inserted portion and the surfaces of the hollow interior portion; and selectively injecting, with a reinforcing and structural material, at least a portion of at least one of (i) the hollow interior portions of the short segments for securing respective inserted portions of the first legs of the reinforcing channels therewithin and (ii) the hollow interior portions of the long segments for securing respective inserted portions of the second legs of the reinforcing channels therewithin.

81. A method according to claim 80, in which each of the segments of frame bar has a recess for securing screen therein and is made of a material selected from the group consisting of extruded aluminum, roll-formed aluminum, roll-formed sheet steel, extruded plastic and pultruded, glass-reinforced thermosetting resin.

82. A method according to claim 80, in which each reinforcing channel is a unitary piece having a bend at approximately ninety degrees to form the first and second legs and a cross section of one of substantially U-shape and substantially Z-shape.

83. A method according to claim 80, in which each reinforcing channel is one of plated steel and high strength plastic.

84. A method according to claim 80, in which a cross section of each reinforcing channel is significantly smaller than a cross section of the respective hollow interior portions of the segments of frame bar for allowing the foamed chemical, prior to solidifying, to pass between the reinforcing channel and surfaces of the hollow interior portions.

85. A method according to claim 80, further comprising securing a wheel mechanism to a respective first leg of each reinforcing channel, the wheel mechanism including a wheel for being guided in a track.

86. A method according to claim 85, further comprising aligning the center line of the wheel mechanism with the center line of a respective leg of the reinforcing channel to which the wheel mechanism is secured.

87. A method according to claim 85, further comprising enclosing the wheel mechanism with decorative side panels.

88. A method according to claim 80, in which each segment of frame bar includes injection apertures, and the structural material is polyurethane foaming material which is injected in said injecting steps into each of the segments through the injection apertures and solidified.

* * * * *